United States Patent
Nagesh et al.

(10) Patent No.: US 12,057,954 B2
(45) Date of Patent: Aug. 6, 2024

(54) VIDEO COMMUNICATION APPLICATION AUTOMATED FEATURES

(71) Applicant: International Business Machines Corporation, Armonk, NY (US)

(72) Inventors: Raghupatruni Nagesh, Visakhapatnam (IN); Narendra Reddy Tippala, Visakhapatnam (IN); Krishna Reddy Venkata Batchu, Visakhapatnam (IN); Saraswathi Sailaja Perumalla, Visakhapatnam (IN); Venkata Vara Prasad Karri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 17/360,441

(22) Filed: Jun. 28, 2021

(65) Prior Publication Data

US 2022/0417050 A1    Dec. 29, 2022

(51) Int. Cl.
*H04L 12/18* (2006.01)
*G10L 15/26* (2006.01)

(52) U.S. Cl.
CPC .......... *H04L 12/1831* (2013.01); *G10L 15/26* (2013.01); *H04L 12/1818* (2013.01); *H04L 12/1822* (2013.01); *H04L 12/1827* (2013.01)

(58) Field of Classification Search
CPC ............. H04L 12/1831; H04L 12/1818; H04L 12/1822; H04L 12/1827; G10L 15/26
See application file for complete search history.

(56) References Cited

U.S. PATENT DOCUMENTS

| | | | |
|---|---|---|---|
| 8,914,452 B2 | 12/2014 | Boston | |
| 11,095,693 B1* | 8/2021 | Wehrung | H04L 65/1089 |
| 2008/0137558 A1* | 6/2008 | Baird | H04L 12/1831 |
| | | | 370/260 |
| 2010/0251177 A1* | 9/2010 | Geppert | H04L 51/046 |
| | | | 709/206 |
| 2012/0131627 A1* | 5/2012 | Chittella | H04N 21/4384 |
| | | | 725/109 |
| 2012/0176466 A1* | 7/2012 | Wrench | H04L 65/1076 |
| | | | 348/E7.083 |
| 2013/0055113 A1* | 2/2013 | Chazin | H04L 12/1822 |
| | | | 715/758 |
| 2013/0325972 A1* | 12/2013 | Boston | G06Q 10/10 |
| | | | 709/204 |
| 2016/0248597 A1* | 8/2016 | Liu | H04L 67/18 |
| 2017/0212898 A1* | 7/2017 | Desmond | H04W 4/80 |

(Continued)

OTHER PUBLICATIONS

Anonymous. "Cognitive meeting minutes capturing teleconference system." Published Oct. 26, 2018. 3 pages. Published by IP.com. https://priorart.ip.com/IPCOM/000255960.

(Continued)

*Primary Examiner* — Raqiul A Choudhury
(74) *Attorney, Agent, or Firm* — Haley J. McClory

(57) ABSTRACT

A processor may receive application data regarding a session on a video communication application. The processor may receive user data regarding one or more participants associated with the session. The processor may analyze application data to identify contextual features of the application data. The processor may identify that a first contextual scenario has occurred.

14 Claims, 5 Drawing Sheets

(56) References Cited

U.S. PATENT DOCUMENTS

2018/0359366 A1* 12/2018 Moncomble ........ H04L 65/1089
2018/0376108 A1* 12/2018 Bright-Thomas .... G06K 9/6274

OTHER PUBLICATIONS

Anonymous. "Disconnected Meetings." Published Feb. 18, 2016. 6 pages. Published by IP.com. https://priorart.ip.com/IPCOM/000245224.

Anonymous. "Method for Distributed Low-Latency Web Conference: Screen Sharing, Recording, and Playback." Published Jul. 12, 2012. 4 pages. Published by IP.com. https:/priorart.ip.com/IPCOM/000219782.

Anonymous. "System & Method to detect and display who's speaking in an on-line meeting." Published Aug. 11, 2009. 3 pages. Published by IP.com. https://priorart.ip.com/IPCOM/000186155.

Anonymous. "System notifying presenter when audience members' screens have updated content from a meeting application." Published May 12, 2011. 6 pages. Published by IP.com. https://priorart.ip.com/IPCOM/000206894.

Dimitriadis, et al., "Meeting Recognition and Understanding." Published Jul. 30, 2013. 5 pages. Published by Microsoft. https://www.microsoft.com/en-us/research/project/meeting-recognition-and-understanding/.

Hori, et al., "Low-Latency Real-Time Meeting Recognition and Understanding Using Distant Microphones and Omni-Directional Camera." Published Feb. 2012. 15 pages. In IEEE Transactions On Audio, Speech, and Language Processing, vol. 20, No. 2. pp. 499-513. https://ieeexplore.ieee.org/document/5983476.

Huilgol, "Top 4 Sentence Embedding Techniques using Python!" Published Aug. 25, 2020. 27 pages. Published by Analytics Vidhya. https://www.analyticsvidhya.com/blog/2020/08/top-4-sentence-embedding-techniques-using-python/.

Joshi, P., "An Introduction to Text Summarization using the TextRank Algorithm (with Python implementation)." Published Nov. 1, 2018. 34 pages. Published by Analytics Vidha. https://www.analyticsvidhya.com/blog/2018/11/introduction-text-summarization-textrank-python/.

Levent-Levi, T., "How does bandwidth affect the user experience of a web meeting?" Published Jun. 8, 2014. 6 pages. Published by Blog Geek. https://bloggeek.me/bandwidth-ux-web-meeting/.

Mell, et al., "The NIST Definition of Cloud Computing," Recommendations of the National Institute of Standards and Technology, U.S. Department of Commerce, Special Publication 800-145, Sep. 2011, 7 pgs.

Mvumbi, et al., "An Online Meeting Tool for Low Bandwidth Environments." Published Oct. 2012. 11 pages. ACM International Conference Proceeding Series. pp. 226-235. https://www.researchgate.net/publication/262173783.

Perera, S., "13 Stream Processing Patterns for building Streaming and Realtime Applications." Published Aug. 3, 2015. 10 pages. Published by WordPress. https://iwringer.wordpress.com/2015/08/03/patterns-for-streaming-realtime-analytics/.

Shi, et al., "Improving Meeting Collaboration And Meeting Experience Between Presenter And Inattentive Participants." Published Sep. 3, 2014. 11 pages. Published by IP.com. https://priorart.ip.com/IPCOM/000238538.

Wikipedia. "Dynamic bandwidth allocation." Printed Jan. 29, 2021. 1 page. Published by Wikipedia.

* cited by examiner

VIDEO COMMUNICATION APPLICATION AUTOMATED FEATURES

BACKGROUND

The present disclosure relates generally to the field of video communication applications, and more specifically to automated features of video communication applications based on contextual scenarios.

The use of video communication allows senders and recipients to interact using both audio and video.

SUMMARY

Embodiments of the present disclosure include a method, computer program product, and system for providing automated features for video communication sessions based on contextual scenarios.

A processor may receive application data regarding a session on a video communication application. The processor may receive user data regarding one or more participants associated with the session. The processor may analyze application data to identify contextual features of the application data. The processor may identify that a first contextual scenario has occurred.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
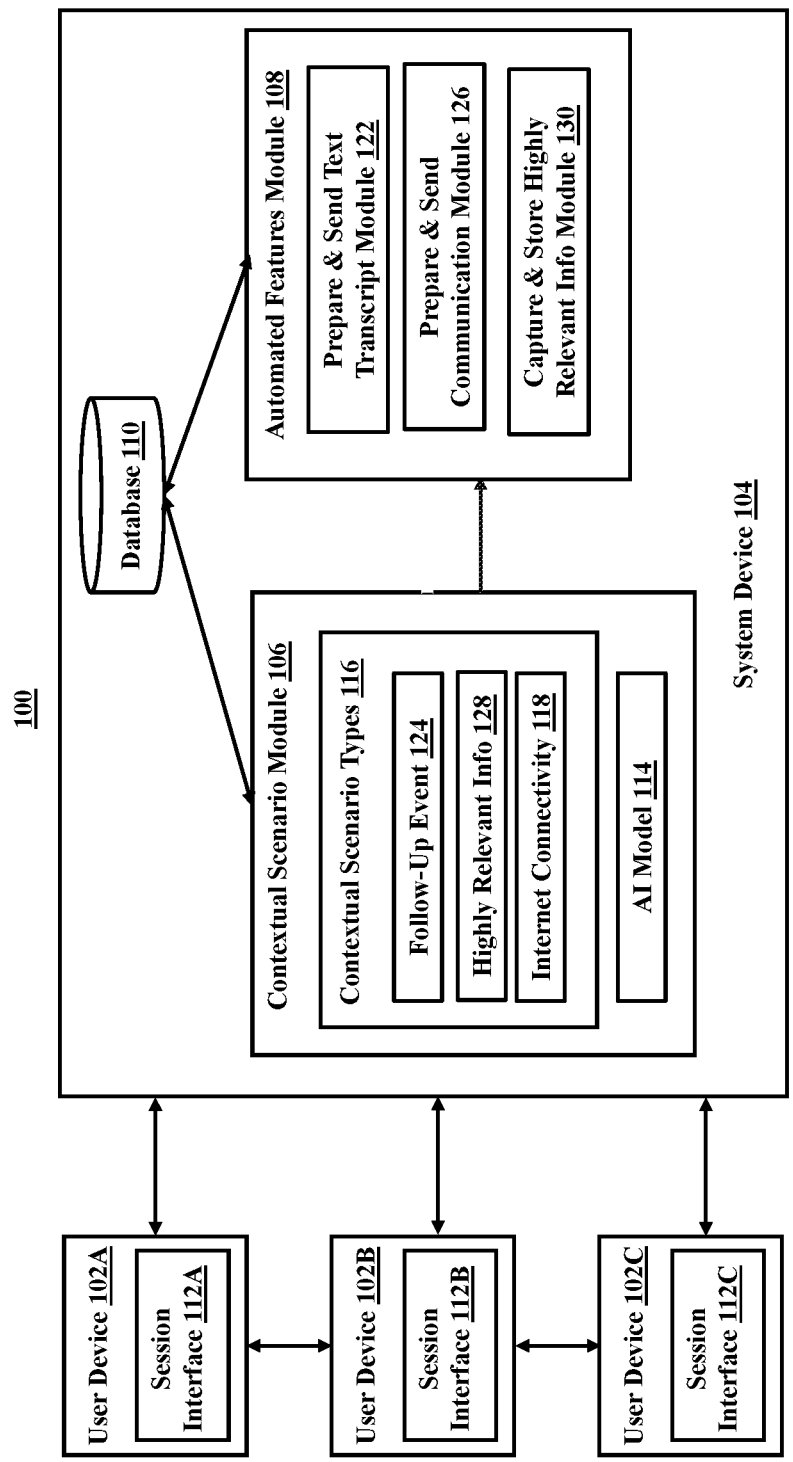
FIG. 1 is a block diagram of an exemplary system providing automated features for video communication sessions based on contextual scenarios, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of video communication applications, and more specifically to automated features of video communication applications based on contextual scenarios. While the present disclosure is not necessarily limited to such applications, various aspects of the disclosure may be appreciated through a discussion of various examples using this context.

In some embodiments, the processor may receive application data from a video communication application. In some embodiments, the application data may include voice data from verbal communications among two or more participants in a meeting on the video communication application (e.g., WEBEX, FACETIME, ZOOM). In some embodiments, the application data may include video data capturing images of the participants in the meeting and/or materials presented visually to participants (e.g., a video clip, a POWERPOINT presentation, a demonstration of how to access a website using a screenshare function). In some embodiments, the application data may include textual communications shared during the meeting, including text based messages communicated from one or more participants to one or more participants in a text chatting feature of the video communication application. In some embodiments, the application data may include documents that are attached to or linked to communications related to the meeting (e.g., documents attached to a meeting invitation or documents shared through the text communication feature of the video communication application). In some embodiments, the application data may include information related to the internet connection of any or all of the current, past, or expected (e.g., anticipated) participants in the video meeting.

In some embodiments, a processor may receive user data regarding one or more participants associated with (e.g., relevant to) the session. In some embodiments, the user data may relate to the identity of participants in the video communication session. In some embodiments, the identity of the participants may be determined by labeling each participant with a tag that provides a unique identifier for each participant (e.g., "participant 1, participant 2, participant 3"). In some embodiments, the user data may identify planned participants for the session. In some embodiments, the planned participants may be identified based on lists of invitees to the meeting, lists of individuals who communicated an intention to join the meeting, lists of individuals who communicated uncertainty about being able to join the meeting, lists of individuals who declined to attend the meeting (e.g., from a calendaring application/interface used to schedule the meeting), etc.

In some embodiments, the user data may relate to individuals who did not participate (or were not anticipated to participate) in the meeting. In some embodiments, the non-participants may be individuals who communicated that they may not join the meeting. In some embodiments, the non-participants may be individuals who are anticipated to join the meeting but have not joined the meeting. In some embodiments, the user data may relate to individuals who are relevant to the meeting who are not participants (e.g., the manager of the team that is having the meeting). In some embodiments, the identity of relevant non-participants may be ascertained from communications regarding the meeting (e.g., on a SLACK channel for a group of people who do work related to the meeting).

In some embodiments, the identity of relevant non-participants may be determined based on the communications made during the meeting. For example, a participant may ask "was Sarah going to join us?". In some embodiments, the identity of relevant non-participants may be determined using artificial intelligence ("AI") models (e.g., using natural language processing or text classification) that understand the context of communications to identify that certain non-participants are relevant to the meeting and relevant to the meeting in a particular way (e.g., tied to a particular context).

In some embodiments, the identity of relevant non-participants may be determined based on materials shared during meeting (e.g., the author of a POWERPOINT presentation displayed during meeting, one of several authors of a scientific article discussed or linked during the meeting). In some embodiments, the identity of the relevant non-participant may be determined by artificial intelligence models that perform text classification of the materials shared during the meeting (e.g., text in documents presented during the video conference or text entered into a text chatting feature of the video communication application). In some embodiments, the relevant non-participants may be identified based on metadata associated with documents used or shared during or in anticipation of the meeting (e.g., an author of a document that was attached to a meeting invitation, the author of edits to a version of the document that was presented to others during the meeting, etc.)

In some embodiments, the processor may uncover background information regarding the individuals relevant to the session (e.g., participants and non-participants). In some embodiments, the background information may come from the video communication application or a meeting scheduling application (e.g., identify of invited participants, required participants, optional participants, meeting organizer; meeting description; documents attached to meeting invite/calendar entry). In some embodiments, the background information may be obtained from additional sources, including a company directory or company organization chart (e.g., providing information about job titles, department names, management chains, the identity of others who work in same group, related groups, etc.).

In some embodiments, the background information may come from communications during the session (e.g., "Sarah was in charge of compiling the budget information for this project and collaborated with Wendy." or "Should we also send this information regarding customer feedback to John?"). In some embodiments, the background information may come from documents shared or presented during the video communication session (e.g., a footnote in a spreadsheet explaining that the data analyzed came from a particular department in a company, metadata showing who authored a document or modified the document, etc.). In some embodiments, the background information may come from information shared in a text chatting features of the video communication application (e.g., a link to an article, where the authors are associated with a subject matter or a high level of expertise in the subject). In some embodiments, the background information may help link an individual to a contextual feature or contextual scenario ascertained from the application data.

In some embodiments, the processor may analyze application data to identify contextual features of the application data. In some embodiments, the processor may identify that a first contextual scenario has occurred. In some embodiments, the processor my utilize natural language processing to identify contextual features of the application data. In some embodiments, the processor may utilize artificial intelligence ("AI") models to output a classification that a first contextual scenario has occurred based on the identification of contextual features in the application data. In some embodiments, the AI model may be a text classification model that has been trained to identify contextual features from historical data (e.g., transcripts of previous sessions on video communication applications) and link those contextual features to one or more contextual scenarios. In some embodiments, the AI model may utilize the user data regarding people relevant to the session to output a classification that a first contextual scenario has occurred.

For example, meeting participants may communicate during a session: "Have we met the sales goal?" "I don't know," and "Sarah and Wendy oversaw the sales effort." The processor may, utilizing natural language processing and a classification AI, identify features of the communication that relate to a first contextual scenario (e.g., unanswered questions needing follow up). The AI may be trained to identify the language patterns that indicate an unanswered question (e.g., language features identifying a question and a response indicating no answer). Based on the identified contextual features, the processor may output that a contextual scenario regarding an unanswered question has occurred.

In some embodiments, the AI model may identify that Sarah and Wendy are people who may be able to answer the question (e.g., based on the association between Sarah and Wendy and sales and based on the proximity [e.g., timing] of the comment about Sarah and Wendy and the unanswered question). In some embodiments, the processor may rely on the user data to obtain contact information for Sarah and Wendy, generate a communication to them regarding the question, verify that Sarah and Wendy have knowledge of sales, etc.

In some embodiments, the first contextual scenario may relate to a follow-up event. In some embodiments, the processor may prepare a communication regarding the follow up event. For example, meeting participants may express in a meeting that a noteworthy occurrence has taken place (e.g., a business group in a workplace has exceeded a sales goal). The meeting participants may additionally express that others should be informed about the noteworthy occurrence. For example, the meeting participants may expressly state that others should be informed (e.g., "We should inform the accounting group that we have exceeded the sales goal.").

In some embodiments, other contextual information obtained from the communications exchanged during the meeting (or the materials exchanged or presented during the meeting) may indicate that the noteworthy occurrence should be communicated to one or more individuals or entities not present or represented at the meeting. For example, the sales numbers indicating that the sales goal has been exceeded may be shared on a spreadsheet document that has a footnote that states that "quarterly performance regarding meeting sales goals should be communicated to the accounting department." As another example, a meeting participant may ask during a meeting, "have we shared this information with the accounting team?" but not expressly state that the information should be shared with the accounting team. Additionally, a meeting participant may ask, "who should be informed about this accomplishment?".

In some embodiments, based on information regarding the contextual scenario communicated during the meeting (e.g., application data), the AI model may determine that a contextual scenario relating to a follow-up event has occurred. In some embodiments, the processor may prepare a communication regarding the follow-up event based on the information communicated during the session (e.g., application data).

In some embodiments, the AI model may identify the type of follow-up event that has occurred from a set of follow-up events. For example, follow-up events may include thanking an individual or a group for a doing a good job (e.g., thanking the sales team for exceeding there sales goal), praising the accomplishment of others (e.g., informing the manager of the sales team that the sales team exceeded its sales target), conveying information obtained from the meeting to others who need that information (e.g., informing the accounting team that the sales goal was met), obtaining answers to outstanding questions, etc.

In some embodiments, the AI model may identify the one or more persons or entities for whom the communication is prepared. In some embodiments, the AI model may identify the person or entities based on information conveyed during the meeting (e.g., a statement of who should be informed). In some embodiments, the AI model may identify the person or entities based on user data regarding people relevant to the session (e.g., determining who is the manager of the sales team or the person in the accounting team that works with this sales group). In some embodiments, the AI model may utilize text generation models to prepare the relevant communication regarding the follow-up event based on the type of follow-up event identified.

In some embodiments, the communication may be sent as a draft communication to one or more meeting participants for those meeting participants to send the final communication (e.g., reviewed or revised draft communication) to the appropriate individual(s) or entities. In some embodiments, the draft communication may be sent to an email application of the one or more individuals who are intended to send the final communication. In some embodiments, the draft communication may be provided as text sent via a text chatting feature of the video communication application. In some embodiments, the text may only be provided to one or more individuals designated to have authority to send the final communication (e.g., the meeting host). In some embodiments, the communication (e.g., draft communication) may include a prompt or a reminder to send the communication to the appropriate individual.

In some embodiments, the processor may confirm an identity of one or more individuals to be notified. In some embodiments, the processor may send a communication regarding the follow-up event to the one or more individuals to be notified. In some embodiments, the identity of the individuals to be notified may be obtained from analyzing the application data to identify contextual features (e.g., mention of a person's name when referring to the accounting department). In some embodiments, the processor may confirm the identity of one or more individuals to be notified based on user data relevant to the session (e.g., information regarding members of the accounting group of a company). In some embodiments, the processor may confirm the identity of the one or more individuals to be notified based on information conveyed during the session (e.g., application data).

As an example, the communication regarding the follow-up event may be sent to the one or more individuals to be notified by email. In some embodiments, the processor may confirm the identity of the individuals to be notified by verifying the means by which to communicate with them. For example, the processor may verify an email address for a person to be notified from a meeting invitation (e.g., in the case the individual to be notified is an absent meeting invitee).

In some embodiments, the processor may verify the email address of the person to whom the email is being sent based on background context information (e.g., part of the user data) regarding the individual. For example, from accessing the company directory, the processor may verify that "John" in the "accounting department" is "John Smith" who is the "Senior Account Manager" for the department which was having the meeting. In some embodiments, confirming the identity of the one or more individuals to be notified may include verifying (e.g., from the company directory): that a person is a current employee, that a person has a job title that is expected (e.g., an accountant and not a software developer), that a person works in the correct department (e.g., accounting and not human resources), that the contact means (e.g., email address, slack address) for communicating with the person matches the contact means in the company directory, etc. In some embodiments, the communication may be sent to a group of people (e.g., a group email list or a Slack channel for a group of people) that includes the one or more individuals to be notified.

In some embodiments, the processor may identify that the first contextual scenario relates to communication of information highly relevant to one or more particular individuals. In some embodiments, the processor may capture the information highly relevant to one or more particular individuals. For example, during a meeting of a team working on a project, a road map for the anticipated progress of the project may be shared to the meeting participants (e.g., one team member may share a presentation to the team).

In some embodiments, based on information regarding the contextual scenario communicated during the meeting, the AI model may determine that a contextual scenario relating to communication of information highly relevant to one or more particular individuals has occurred. In some embodiments, the identity of the one or more particular individuals may be determined from the information communicated during the meeting (e.g., application data). In some embodiments, the processor may utilize user data regarding people relevant to the session to determine the identity of the one or more particular individuals for whom the information is highly relevant. For example, the processor may identify that the project roadmap contains information highly relevant to one or more particular individuals based on analyzing application data to identify contextual features. The processor may identify that the project roadmap has information that is useful or valuable to the division lead for the team based on the analysis of application data (e.g., based on the information exchanged during the meeting). The processor may identify the one or more particular individuals for whom the information is highly relevant based on user data regarding people relevant to the session.

In some embodiments, the captured information may be communicated to the one or more particular individuals for whom the information is highly relevant. Continuing the example, the page of the presentation having the project roadmap may be captured, for example, by taking a screenshot of the video communication application showing that page. The project roadmap may be emailed to the division lead.

In some embodiments, capturing the information highly relevant to one or more particular individuals may include making one or more snippets of a video recording of the video communication session (e.g., meeting). The snippets may be made accessible to the one or more particular individuals by providing the individuals with a link to the video snippet and password. For example, a first snippet of the video recording (e.g., from minutes 0-10) may be made accessible to a first group of call participants who worked on the materials that were discussed during the first ten minutes of the call. A second snippet of the video recording (e.g., from minutes 10-20) may be made accessible to a second group of call participants who worked on the materials that were discussed during the second ten minutes of the call. In some embodiments, the information captured may be portions of the transcript of conversations/communication exchanges between participants in the meeting.

In some embodiments, the processor may analyze an image that was conveyed during the meeting using an image classification algorithm such as a convolutional neural network ("CNN") or you only look once ("YOLO") artificial intelligence models to determine if highly relevant information was conveyed. In some embodiments, the video feed from the meeting may be analyzed using computer vision applications such as OpenCV. In some embodiments, the processor may use speech to text capabilities to obtain information from the audio/conversations during the meeting that identifies a person or group for whom the information conveyed was highly relevant. In some embodiments, an artificial intelligence model may link the information conveyed during the meeting (e.g., the highly relevant information) to the one or more particular individuals for whom the information is highly relevant (e.g., based on background information regarding participants and non-participants relevant to a meeting).

In some embodiments, the information may be stored in a repository of captured information. In some embodiments, the repository of captured information may be made accessible to any or all meeting participants. In some embodiments, the repository of captured information may be made accessible to some meeting participants or non-participants based on an understanding of the contextual relationship between the participants or non-participants and the captured information. For example, during a team meeting of customer support professionals, particular details about technical aspects of a project that customers would like modified may be shared. The details about the technical aspects of the project may be captured (e.g., in multiple snippets of feedback from multiple customers regarding the technical information) and shared with the engineering team that is providing technical support for this project. As another example, the repository may store information such as the project roadmap that is made accessible through the repository to the division lead.

In some embodiments, the first contextual scenario may relate to internet connectivity of a first participant. In some embodiments, a textual transcript of an audio stream of the video communication session may be prepared. In some embodiments, the textual transcript may be sent to the first participant. In some embodiments, the first participant may be an individual who is currently participating in the video communication session, who previously participated in the video communication session, or who was anticipated to participate in the video communication session.

In some embodiments, the internet connectivity contextual scenario (e.g., that the first participant is having low internet connectivity levels) may be identified by checking with internet service providers to determine internet connectivity levels (e.g., whether connected or an amount/degree of connection) for any or all of the past, current, or expected participants for the session. In some embodiments, low internet connectivity may be determined by analyzing the audio or video provided by the first participant to the system and determining that the quality of the audio received (e.g., based on occurrences of static, disruption, delayed audio, low volume, disturbed or poorly intelligible speech incidents, etc.) or video (based on occurrences of static, disruption, failure to screen share, incidents having poor video input metrics, etc.) falls below a threshold. In some embodiments, the data regarding internet connectivity from the internet service provider may be compared to a threshold where if the data falls below a threshold the connectivity is determined to be low (and a textual transcript is sent to the first participant).

For example, John may be a participant in a video communication session with four other teammates. The video communication application may determine that John is having low internet connectivity by comparing his internet connectivity levels to a threshold and determining that his internet connectivity levels falls below the threshold value. In some embodiments, any audio communications made after this determination may be transcribed using a speech to text application programming interface ("API"). In some embodiments, the textual transcript of the audio communications made by the remaining four teammates may be sent to John (e.g., on the video communication application on John's device) as the textual transcript is prepared. In some embodiments, the textual transcript may be prepared in real-time or near real-time. In some embodiments, the textual transcript may be stored in a repository that is updated periodically when there is good internet connectivity.

In some embodiments, the processor may send a command to the device (e.g., computer) of the first participant to disable a video and/or an audio feed to and/or from the first participant. In some embodiments, the video communication application may disable the audio feed to and/or from the first participant in response to identifying that a first contextual scenario relating to internet connectivity (e.g., low connectivity) has occurred. In some embodiments, the video communication application may disable the video feed to and/or from the first participant in response to identifying that an internet connectivity scenario has occurred. In some embodiments, the video communication application may predict the next person who is to speak during the meeting (e.g., after the current speaker has an internet connectivity issue, from a meeting agenda) and prepare the next person to speak (e.g., turn on the audio and video feed for the next person).

Referring now to FIG. 1, a block diagram of a system 100 for providing automated features for video communication sessions is illustrated. System 100 includes a user devices 102A-C and a system device 104. The system device 104 is configured to be in communication with the user devices 102A-C. The system device 104 includes a contextual scenario module 106, an automated features module 108, and a database 110. The database 110 stores the application data regarding a session on a video communication application and user data regarding people relevant to the session. In some embodiments, the user devices 102A-C and the system device 104 may be any devices that contain a processor configured to perform one or more of the functions or steps described in this disclosure.

Users on user devices 102A-C, having session interfaces 112A-C, are engaged in a video communication session on a video communication application. Audio, video, and textual communications may be exchanged among the users on session interfaces 112A-C. Application data regarding the session is sent from the user devices 102A-C to the database 110 of the system device 104. User data regarding people relevant to the session is also obtained from the user devices 102A-C and stored in database 110. User data may also be stored in database 110 from prior usage of system device 104 or from training of the AI model 114 of the contextual scenario module 106. The contextual scenario module 106 may receive the application data and the user data. The contextual scenario module 106 may analyze the application data to identify contextual feature of the application data using AI model 114. The contextual scenario module 106 may identify that a first contextual scenario has occurred.

In some embodiments, the contextual scenario module 106 may identify that the contextual scenario relates to a type of contextual scenario 116. In some embodiments, the contextual scenario module 106 may identify that the contextual scenario relates to internet connectivity 118 of a first participant (e.g., on user device 102A). The first participant on user device 102A may be having low internet connectivity. The automated features module 108 may then use the prepare and send a textual transcript module 122 to prepare and send a textual transcript to the first participant. The prepare and send a textual transcript module 122 may prepare a textual transcript of the audio stream of the session. The prepare and send a textual transcript module 122 may then send the textual transcript to the session interface 112A of the first participant. The automated features module 120 may also send a command to the user device 102A to turn off the audio and video feed to and from the session interface 112A (and to and from session interfaces 112B-C of the other session members/users).

In some embodiments, the contextual scenario module 106 may identify that the contextual scenario relates to a follow-up event 124. A speech to text application may be used to create a transcript of the communications during the session that is stored in database 110. The AI model 114 may analyze the communications, using natural language processing, and identify that a follow-up event has occurred. For example, the users may discuss that a new team member accomplished a difficult task, which the AI model classifies a follow-up event warranting a thank you email. The automated features module 108 may then use prepare and send communication module 126 to draft a thank you email, confirm the identity of the person to be thanked (e.g., utilizing user data stored in database 110), and send the thank you email to that person (e.g., to a user device not illustrated).

In some embodiments, the contextual scenario module 106 may identify that the contextual scenario relates communication of information highly relevant to one or more particular individuals 128. The automated features module 108 may use the capture and store highly relevant information module to capture the information that is highly relevant to particular individuals, store the information in a repository (database 110), and make the information accessible to the relevant individuals.

Figure 2:
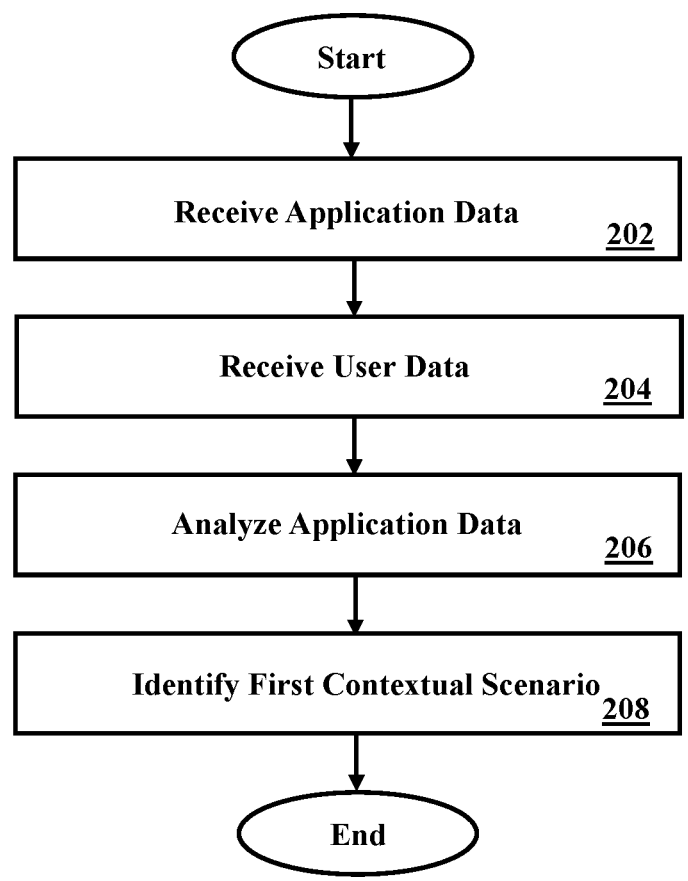
FIG. 2 is a flowchart of an exemplary method system providing automated features for video communication sessions based on contextual scenarios, in accordance with aspects of the present disclosure.

Referring now to FIG. 2, illustrated is a flowchart of an exemplary method 200 for providing automated features for video communication sessions, in accordance with embodiments of the present disclosure. In some embodiments, a processor of a system may perform the operations of the method 200. In some embodiments, method 200 begins at operation 202. At operation 202, the processor receives application data regarding a session on a video communication application. In some embodiments, method 200 proceeds to operation 204, where the processor receives user data regarding people relevant to the session. In some embodiments, method 200 proceeds to operation 206. At operation 206, the processor analyzes application data to identify contextual features of the application data. In some embodiments, method 200 proceeds to operation 208. At operation 208, the processor identifies that a first contextual scenario has occurred.

As discussed in more detail herein, it is contemplated that some or all of the operations of the method 200 may be performed in alternative orders or may not be performed at all; furthermore, multiple operations may occur at the same time or as an internal part of a larger process. Additionally, it is noted that each embodiment envisioned herein is opt-in and each user may choose to have their communications recorded and/or analyzed.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
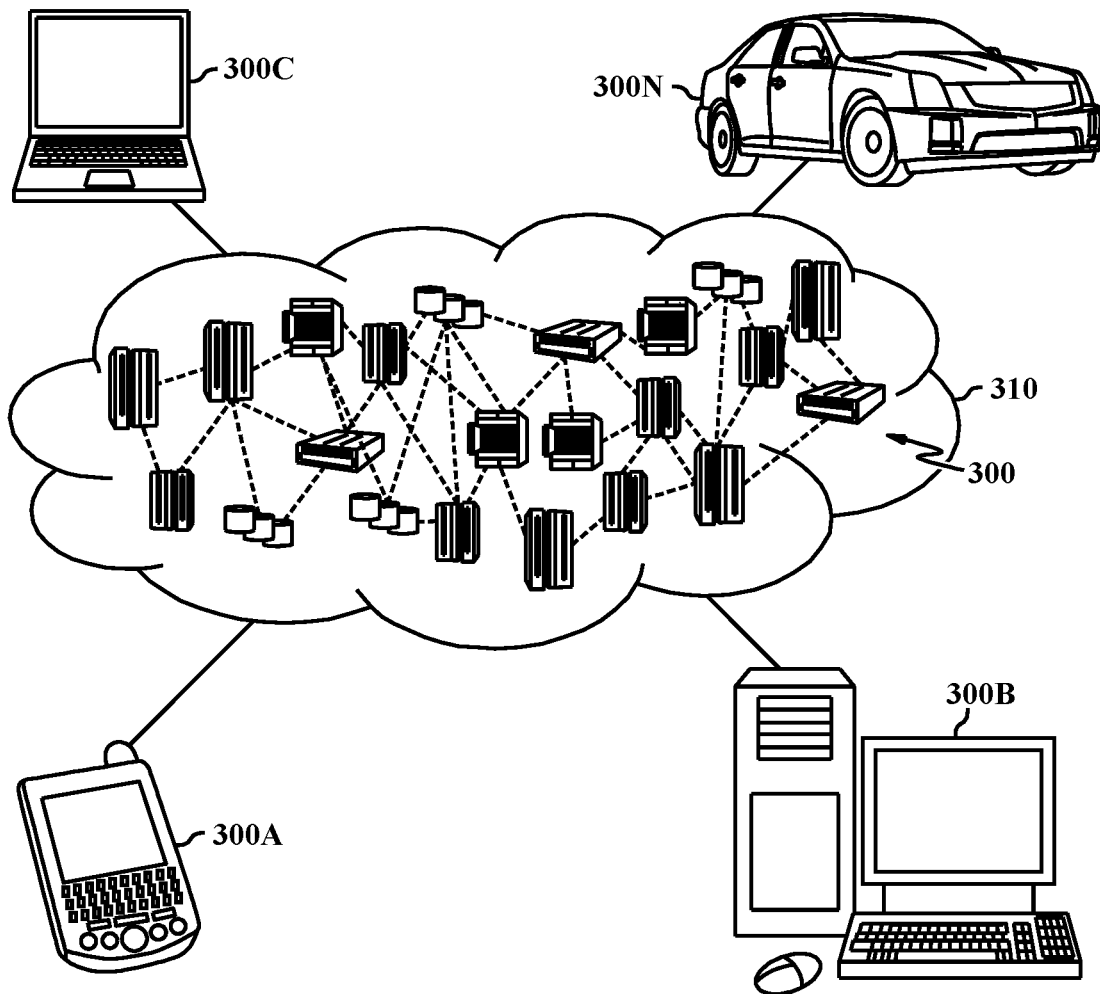
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
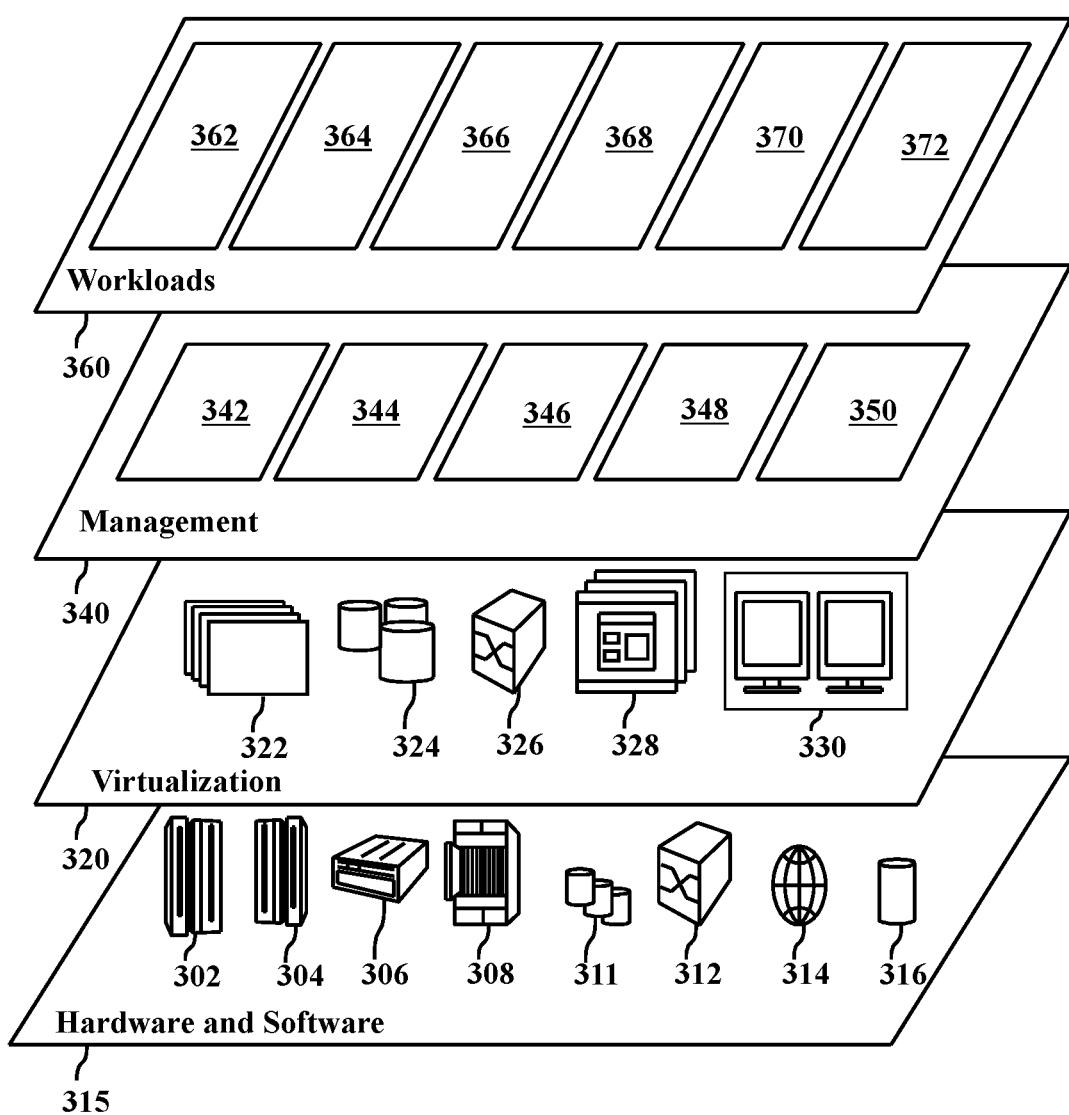
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and providing automated features for video communication sessions 372.

Figure 4:
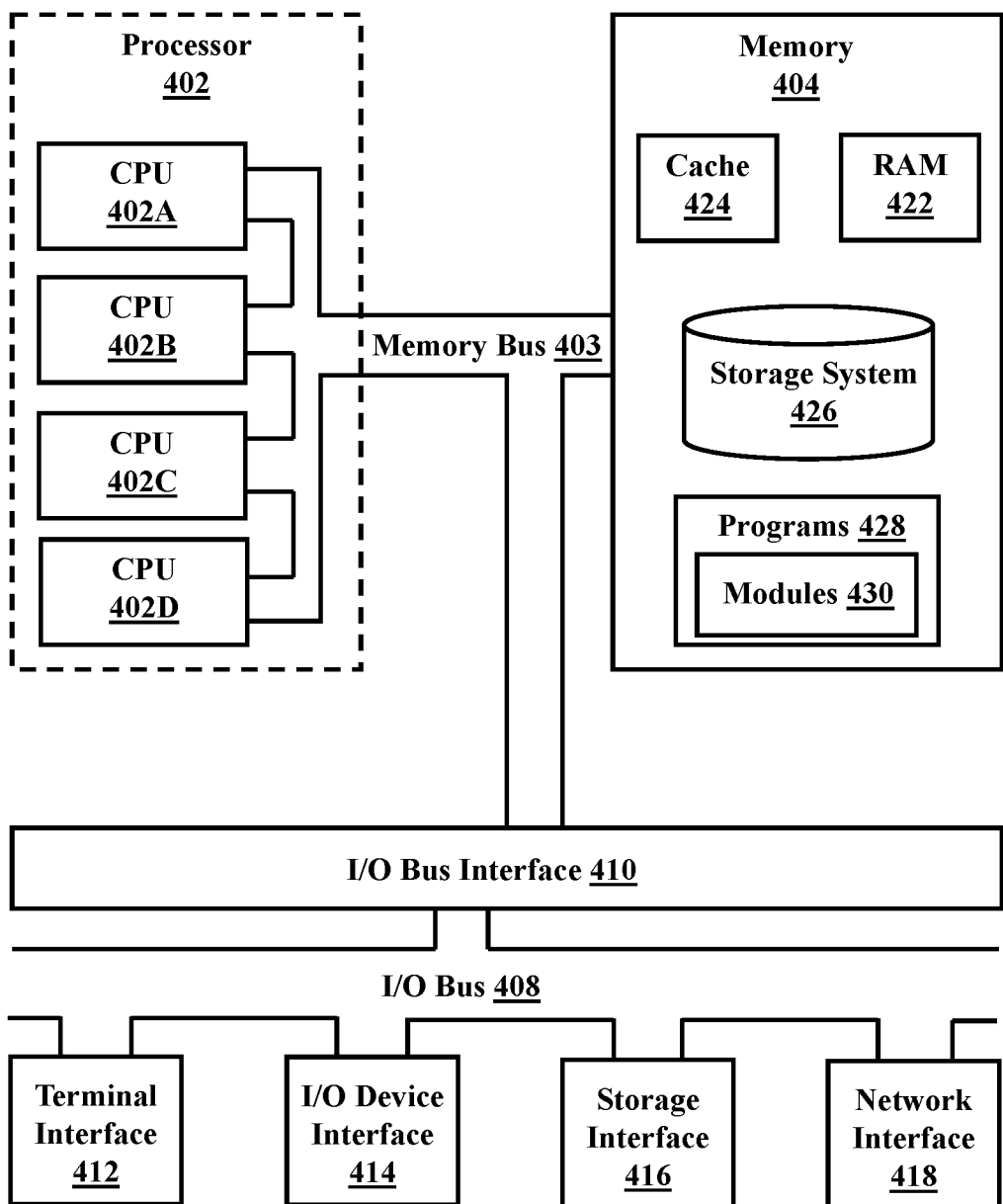
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:
   receiving, by a processor, application data regarding a session on a video communication application;
   receiving user data regarding one or more participants associated with the session;
   analyzing application data to identify contextual features of the application data;
   identifying that a first contextual scenario has occurred;
   analyzing application data and user data associated with the session;
   identifying one or more unanswered questions associated with the one or more participants of the session;
   identify one or more informed persons associated from one or more work communications with the one or more unanswered questions, wherein the one or more informed persons are not associated with the session;
   issuing a communication to the one or more informed persons, wherein the communication includes a request for answers to the one or more unanswered questions;
   predicting, responsive to identifying the first contextual scenario, a first participant of the one or more participants will speak;
   modifying a first feed associated with the session based, at least in part, on the first participant predicted to speak, wherein modifying the first feed includes sending a command to a device of the first participant to disable the feed; and
   activating a second feed of a second participant of the one or more participants associated with the session, responsive to modifying the first feed.

2. The method of claim 1, wherein the first contextual scenario relates to internet connectivity of the first participant, and wherein the method further comprises:
   preparing a textual transcript of an audio stream of the session; and
   sending the textual transcript to the first participant.

3. The method of claim 1, wherein the first contextual scenario relates to a follow-up event, and wherein the method further comprises:
   confirming an identity of one or more individuals to be notified; and
   sending a communication regarding the follow-up event to the one or more individuals to be notified.

4. The method of claim 1, wherein the first contextual scenario relates to communication of information to one or more particular individuals, and wherein the method further comprises:
capturing the information.

5. The method of claim 4, further comprising:
storing the captured information in a repository.

6. A system comprising:
a memory; and
a processor in communication with the memory, the processor being configured to perform operations comprising:
receiving application data regarding a session on a video communication application;
receiving user data regarding one or more participants associated with the session;
analyzing application data to identify contextual features of the application data;
identifying that a first contextual scenario has occurred;
analyzing application data and user data associated with the session;
identifying one or more unanswered questions associated with the one or more participants of the session;
identify one or more informed persons associated from one or more work communications with the one or more unanswered questions, wherein the one or more informed persons are not associated with the session;
issuing a communication to the one or more informed persons, wherein the communication includes a request for answers to the one or more unanswered questions;
predicting, responsive to identifying the first contextual scenario, a first participant of the one or more participants will speak;
modifying a first feed associated with the session based, at least in part, on the first participant predicted to speak, wherein modifying the first feed includes sending a command to a device of the first participant to disable the feed; and
activating a second feed of a second participant of the one or more participants associated with the session, responsive to modifying the first feed.

7. The system of claim 6, wherein the first contextual scenario relates to internet connectivity of the first participant, and wherein the processor is further configured to perform operations comprising:
preparing a textual transcript of an audio stream of the session; and
sending the textual transcript to the first participant.

8. The system of claim 6, wherein the first contextual scenario relates to a follow-up event, and wherein the processor is further configured to perform operations comprising:
confirming an identity of one or more individuals to be notified; and
sending a communication regarding the follow-up event to the one or more individuals to be notified.

9. The system of claim 6, wherein the first contextual scenario relates to communication of information to one or more particular individuals, and wherein the processor is further configured to perform operations comprising:
capturing the information.

10. The system of claim 9, the processor being further configured to perform operations comprising:
storing the captured information in a repository.

11. A computer program product comprising a computer readable storage medium having program instructions embodied therewith, the program instructions executable by a processor to cause the processor to perform operations, the operations comprising:
receiving application data regarding a session on a video communication application;
receiving user data regarding one or more participants associated with the session;
analyzing application data to identify contextual features of the application data;
identifying that a first contextual scenario has occurred;
analyzing application data and user data associated with the session;
identifying one or more unanswered questions associated with the one or more participants of the session;
identify one or more informed persons associated from one or more work communications with the one or more unanswered questions, wherein the one or more informed persons are not associated with the session;
issuing a communication to the one or more informed persons, wherein the communication includes a request for answers to the one or more unanswered questions;
predicting, responsive to identifying the first contextual scenario, a first participant of the one or more participants will speak;
modifying a first feed associated with the session based, at least in part, on the first participant predicted to speak, wherein modifying the first feed includes sending a command to a device of the first participant to disable the feed; and
activating a second feed of a second participant of the one or more participants associated with the session, responsive to modifying the first feed.

12. The computer program product of claim 11, wherein the first contextual scenario relates to internet connectivity of the first participant, and wherein the processor is further configured to perform operations comprising:
preparing a textual transcript of an audio stream of the session; and
sending the textual transcript to the first participant.

13. The computer program product of claim 11, wherein the first contextual scenario relates to a follow-up event, and wherein the processor is further configured to perform operations comprising:
confirming an identity of one or more individuals to be notified; and
sending a communication regarding the follow-up event to the one or more individuals to be notified.

14. The computer program product of claim 11, wherein the first contextual scenario relates to communication of information to one or more particular individuals, and wherein the processor is further configured to perform operations comprising:
capturing the information; and
storing the captured information in a repository.

* * * * *